July 27, 1965  J. C. BEER  3,197,245
PRELOADED BALL JOINT

Filed May 16, 1961  2 Sheets-Sheet 1

INVENTOR.
JACK C. BEER,
BY
ATTORNEY

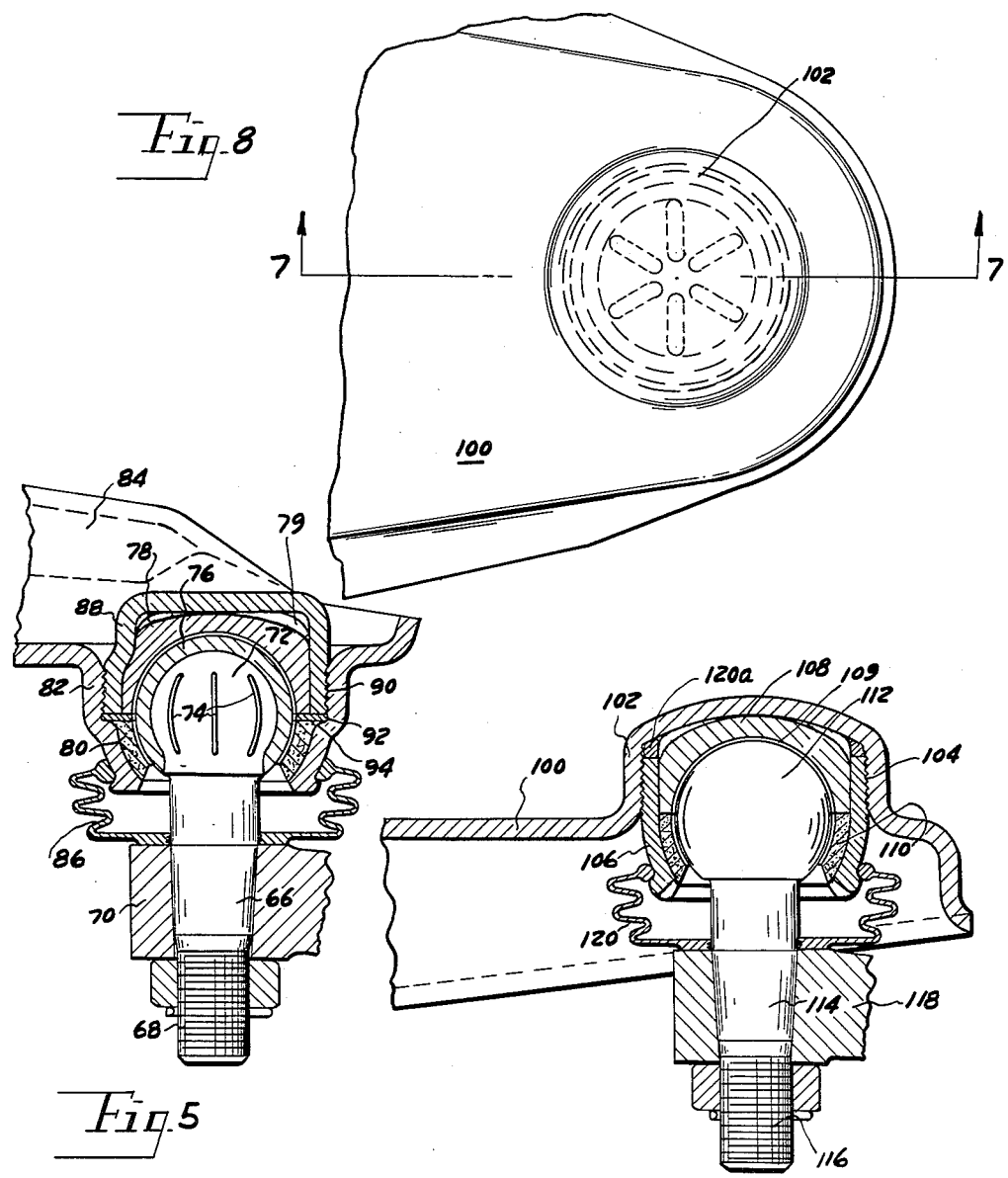

3,197,245
PRELOADED BALL JOINT
Jack C. Beer, 13269 Bloomfield, Warren, Mich.
Filed May 16, 1961, Ser. No. 110,456
1 Claim. (Cl. 287—87)

This invention relates to a universal joint of the type employing a ball rotatable within a socket and more particularly to a suspension or steering system for front wheels of an automotive vehicle employing such a joint.

It is desirable that ball joints which are employed in automotive suspension or steering systems provide low friction characteristics at slow rotational and oscillatory velocities and still provide a definite resistance to rotation of the ball stud within the socket at higher velocities. This resistance should have a high enough value to effectively dampen external rotational forces produced when the vehicle's encounter all types of road irregularities and yet should not have such a high value to require extreme driver effort at the steering wheel to turn the vehicle's road wheels. Ball joints, of the type presently used, do not have the desirable low friction characteristic and it is difficult to manufacture ball joints that provide this characteristic by other means currently known to the art.

Previous ball joints have employed internal compression springs or other mechanical loading devices to produce a predetermined range of turning or oscillating resistance. As these units wear and and the springs lose some of their initial load capacity, the ball joints fail to dampen vibratory oscillations of the wheels about their steering axis and an annoying feedback occurs in the steering system. The feedback is amplified by wheel unbalance and wear in the steering gear and its connections.

The present invention therefore contemplates a ball joint for use in a vehicle suspension system incorporating means for insuring a proper initial joint preload and also providing means for recovering the original preload when wear occurs on the surfaces of the moving parts during prolonged useage without disassembling the joint from its attaching structural supporting members.

This joint broadly takes the form of a hemispherical ball stud captured in a socket formed of two plastic hemispheres: one of the hemispheres engages the ball's upper surface, and the other hemisphere engages the ball's lower surface. The hemispheres are supported toward one another so as to compress the ball by a pair of external retaining members which thread within one another in such a manner that an increase or decrease in threaded contact between the two displaces the flexible top bearing into grooves on its upper surface and fills voids left by clearances between it and its surrounding or contacting parts so as to vary the compression load on the ball. Means are provided for adjusting the relative threaded engagement of the two members while the ball joint is disposed in the vehicle's suspension system and further means are provided for locking the threading assembly in a particular orientation.

The upper plastic hemisphere is formed of a urethane plastic having a higher hardness value, greater tensile strength, and better recovery from heavy impact loads than normally obtained in other elastomeric compounds currently known. It is formed with a plurality of grooves on its upper, convex surface so that its concave surface may conform to the exact shape of the ball within narrow limits and uniformly distribute the load over the entire bearing surface to reduce wear.

It is therefore seen to be an object of the present invention to provide a ball joint for use in a suspension system wherein the frictional pre-load characteristics of the joint may be maintained while it is in service.

Another object is to provide a joint of simple construction so as to be low in cost and high in reliability.

Other objects, advantages, and applications of the present invention will be made apparent by the following detailed description of three embodiments of the invention. The description makes reference to the accompanying drawings in which:

FIG. 5 is a sectional view of a second embodiment of the present invention;

FIG. 6 is a detailed sectional view of the ball employed in the embodiment of FIG. 5;

FIG. 7 is a sectional view of a third embodiment of the present invention taken along lines 7—7 of FIG. 8; and FIG. 8 is a top view of the embodiment of FIG. 7, illustrating the compact contour obtained with this construction.

The various embodiments of the invention are illustrated as forming a part of an automotive front wheel suspension system, but it should be understood that the invention would have application in any mechanism which required a preload ball joint.

Figure 1:
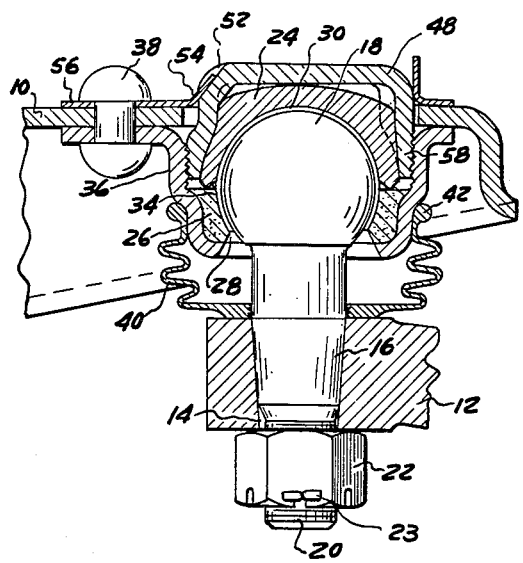
FIG. 1 represents a sectional view of a first embodiment of the ball joint invention taken along lines 1—1 of FIG. 2.
Figure 2:
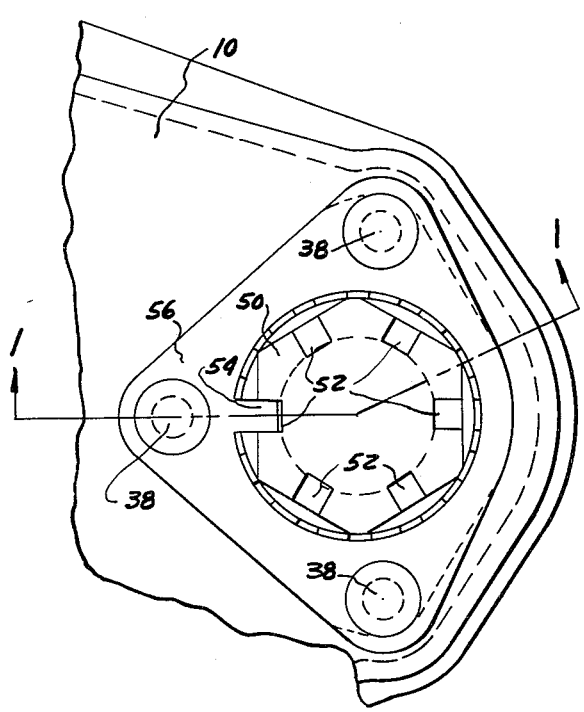
FIG. 2 is a top view of the ball joint of FIG. 1, illustrating a locking device for this invention.
Figure 3:
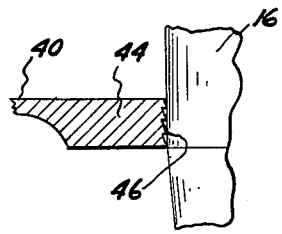
FIG. 3 is a magnified sectional view of a portion of the external seal of FIG. 1, illustrating the grooves that act as a barrier against dirt and water penetration.
Figure 4:
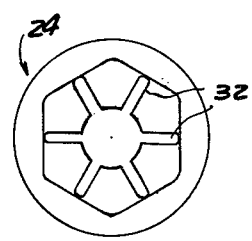
FIG. 4 is a top view of the upper ball retaining bearing employed in the embodiment of FIG. 1, indicating the grooves that permit conformity of the bearing surface over the entire upper ball stud surface shown in FIG. 1.

The embodiment of the invention illustrated in FIGS. 1, 2, 3, and 4 is disposed in a vehicle suspension system between a control arm 10 and a wheel spindle 12. A tapered hole 14 through the wheel spindle 12 supports a tapered shank 16 of a hemispherical ball stud 18. The tapered shank 16 terminates at its lower end in a threaded section 20 which projects through the lower end of the wheel spindle 12 and is affixed within the aperture 14 by means of a lock nut 22 and cotter pin 23.

The hemispherical ball stud 18 is captured between the concave surface of an upper bearing member 24 and the concave surface of a lower bearing member 26 which has a central aperture 28 through which the tapered shank 16 extends. The upper bearing member 24 is formed of a polyurethane formulation having a high load bearing capacity, excellent recovery from deformation under load, and good vibration dampening properties.

It has been determined that the urethane composition must have a hardness in excess of 95 on the Shore Durometer "A" scale. It must have tensile strength in excess of 6000 p.s.i. in order to sustain continual impact loads.

The concave surface of the upper bearing member 24 is covered with a low friction plastic material 30 that is in total contact with the external surface of the hemispherical ball stud 18 to reduce wear. Plastic materials that satisfy the requirements for a low friction bearing surface 30 are the polymeric fluorocarbon resin, tetrafluorethylene; the acetal resin, delrin; the polyamide resin, nylon; and the polyester resin, linear polyethylene. This lining 30 may be bonded to the internal surface of the bearing 24 in the form of a plastic colloid dispersion or close-knit woven fiber cloth whose bonding surface has been mechanically abraded or chemically treated by caustic chemicals.

The top surface of the bearing 24 is formed with a plurality of radial grooves 32 which are useful in allowing the bearing surface to conform to the contour of the ball stud 18 with a high degree of precision. In the absence of the grooves 32 and their intermediate ridges, it would be difficult to obtain conformity between the mating parts due to manufacturing variations in the parts and there would be no space so the bearing could deflect under high impact loads. Momentary deflection of this bearing 24 will decrease the shock on the external retaining members and prolong their useful life.

The lower bearing 26 is a high shear resistance plastic composition such as phenolformaldehyde resin impregnated cloth that provides high pull-out strength around its aperture 28 and may have its surface 34 coated with a material similar to that used on the surface 30 of the upper bearing 24. The inner surface of bearing coatings 30 and 34 are covered with a suitable tenacious rust-inhibiting grease to provide a lubricated-for-life ball joint assembly. The lower bearing 26 is supported in a stamped steel lower housing member 36 which is affixed to the lower side of the control arm 10 at three points by rivets 38.

A primary purpose of these bearing liners 30 and 34 is to reduce vehicle ride harshness and steering effort at low oscillating and turning velocities. When certain plastics, especially tetrafluorethylene fibers, are used as bearing surfaces, the resulting friction characteristics increase with the linear velocity of the adjacent contacting surface, imparting a physical characteristic similar to fluid dampening. The use of tetrafluorethylene in automotive suspensions and steering ball joint bearings is especially desirable where low friction forces are required during lower velocities of boulevard ride motions and during slow steering maneuvers when parking a vehicle. At "wheel hop" frequencies of suspension systems and "wheel fight" frequencies of steering systems, tetrafluorethylene's physical characteristics are desirable since it helps suppress the external disturbances in these systems due to the very high dampening forces induced by this material in the ball joints.

A plastic boot 40 is utilized to cover the aperture 28 in the lower bearing and a similar aperture in the lower housing member 36 to prevent dirt or water from being disposed between the ball stud 18 and its mating bearing surfaces. The boot 40 is attached to the lower housing member 36 by means of a lip 42 which stretches over the housing member and elastically engages the housing member. The lower end of the boot 40 is formed with a thickened section 44 which has a central aperture formed with a plurality of annular sawtooth grooves 46 which may be best seen in the section of FIGURE 3. These grooves and the interior of the boot are packed with grease and the grooves engage the straight portion of the stud shank 25 with an interference fit. This allows rotation of the stud 16 within the boot section 44 while the annular grooves act as successive barriers to the penetration of water or dirt.

The upper bearing section 24 is supported in a socket 48 which has a hexagonal head 50. The flats of the hex are grooved or indented as at 52 to receive a locking lug 54 which is affixed to a plate 56 to lock the socket in a particular rotational position. The plate 56 is affixed to the top of the control arm and is retained by the same rivets 38 which retain the lower housing member 36.

The socket 48 has screw threads, lugs or ramps on its lower outer surface 58 which engage with threads, lugs or ramps on the upper internal surface of the lower housing member 36. Thus rotational engagement of the socket 48 within the lower housing member 36 presses the upper bearing 24 and the lower bearing 26 toward one another increasing the pressure on the ball stud 18. The exact rotational position of the socket 48 may be adjusted to provide a particular desired preload on the ball stud 18 and this rotational position may be locked by means of the lug 54 or other alternate locking means.

Bearing wear which occurs in service may be corrected simply by lifting the lug 54 and rotating the socket 48 so as to further engage its threaded contact with the lower housing 36. This decreases the spacing between the concave surfaces of the upper bearing 24 and the lower bearing 26 due to wear or flaking of the coatings 30 and 34 and thus recovers the original preload on the ball stud 18 to prevent annoying feedback to the steering wheel when the road wheels encounter road irregularities. The socket may be locked in this new rotational position with the lug 54.

FIGURES 5 and 6 illustrate a second embodiment of the invention. In this embodiment, a stud having a tapered shank 66 and a threaded end section 68 is retained within a tapered aperture in the control arm 70. The hemispherical section of the stud 72 is formed with a plurality of grooves 74 which allows the ball to be coated with a plastic covering 76 which may be injection molded around the ball. The plastic coating 76 may be formed of materials similar to those employed in the bearing members 24 and 26 of the embodiment of FIGURE 1. This technique allows a high precision ball surface to be formed with low frictional characteristics. The coating 76 also acts to prevent oxidation of the metallic ball stud and eliminates the necessity for honing and chrome plating. The ball surface 76 is engaged by an upper plastic bearing member 78 and a lower plastic bearing member 80 which is attached to a control arm 84 in a suitable manner.

The upper plastic bearing member is formed of a urethane composition having a hardness in excess of 95 on the Shore Durometer "A" scale and a tensile strength in excess of 6000 p.s.i. This tensile strength may be achieved or exceeded without reducing impact flexibility through the use of certain additives which are known to those skilled in the plastics art. The bearing member 78 has a plurality of radial grooves 79 formed on its upper surface. These grooves act in the same manner as the grooves 32 to give the bearing a degree of conformity with respect to the ball stud 72.

A boot 86 with an annular groove seal protects the aperture in the housing 82, which is shown as an integral part of control arm 84, and the bearing 80 from dirt or water penetration. The upper bearing 78 is disposed within a metal socket 88 having threads 90 on its lower outer surface which mate with similar threads on the lower housing member 82.

A shim 92 is disposed within the lower edge of the socket 88 and the upper edges of shoulder 94 and a lower housing member 82 and the lower bearing 80. The shim thus determines the positional relationship between the socket 88 and the lower housing 82 and thereby controls a clearance provided for the ball 72 within the bearings 78 and 80. When wear decreases the original preload on the ball, a socket 88 may be removed and a thinner shim substituted for the original shim 92. When the socket is replaced, the clearance between it and the lower housing 82 is decreased and additional load is thereby applied to the ball 72.

In the embodiment disclosed in FIGURES 7 and 8, a control arm 100 has an integral socket 102 with a threaded internal surface 104. A lower housing member 106 has a threaded exterior upper surface which engages with the threads 104 so as to form a cavity for an upper bearing member 108 and a lower bearing member 110. These members capture a ball stud 112 which has a tapered shank 114 and a threaded end 116 for placement within a wheel spindle 118. A boot 120 covers the aperture formed in the housing 106 in the bearing 110 for the shank 114 of the stud. A shim 120a is disposed between the upper end of the lower housing member 106 and the lower edge of the socket 102. The thickness of the shim thus determines the cavity between the bearings 108 and 110 and thus the load which is applied to the hemispherical ball 112. Replacement of the original shim with a thinner one increases the pressure applied to the ball so as to correct for wear of the bearing members and stud.

The upper bearing member 108 is formed of urethane in the same manner as its equivalents in the previous embodiments and has a plurality of radial grooves 109 which allow it to conform to the surface of the ball 112.

Having thus described my invention, I claim:

A ball joint comprising in combination two control arms, a stud with a substantially spherical ball rigidly secured to one of said arms, said ball having a plurality of circumferential grooves extending axially from adjacent its apex to adjacent the opposite end thereof and said ball being covered by a plastic coating thereon with said coating interlocked in said grooves, a first plastic bearing member, said first bearing member having a semi-spherical concave surface engaging the upper surface of said ball and a convex surface disposed on the side opposite to said semi-spherical concave surface, said convex surface having a plurality of radially extending grooves formed therein, a second plastic bearing member having a semi-spherical concave surface engaging the lower half of the ball, and adjustable housing means carried by the other of said control arms, said housing holding said bearing members and adjustably clamping said plastic coated ball between said first and second plastic bearing members.

References Cited by the Examiner

UNITED STATES PATENTS

| | | | |
|---|---|---|---|
| 1,561,745 | 11/25 | Redfield | 308—244 X |
| 1,909,010 | 5/33 | Riker. | |
| 2,473,307 | 6/49 | Seipt et al. | 308—244 |
| 2,635,894 | 4/53 | Jackman. | |
| 2,885,248 | 5/59 | White. | |
| 2,973,980 | 3/61 | Vogt et al. | 287—87 |
| 3,017,209 | 1/62 | Thomas. | |
| 3,025,090 | 3/62 | Langen. | |
| 3,063,744 | 11/62 | Flumerfelt | 287—87 |

FOREIGN PATENTS

| | | |
|---|---|---|
| 1,098,381 | 1/61 | Germany. |
| 540,712 | 10/41 | Great Britain. |

CARL W. TOMLIN, *Primary Examiner.*

WILLIAM FELDMAN, *Examiner.*